No. 607,205. Patented July 12, 1898.
S. T. WILSON.
ROTARY ENGINE.
(Application filed Aug. 21, 1897.)
(No Model.) 2 Sheets—Sheet 1.
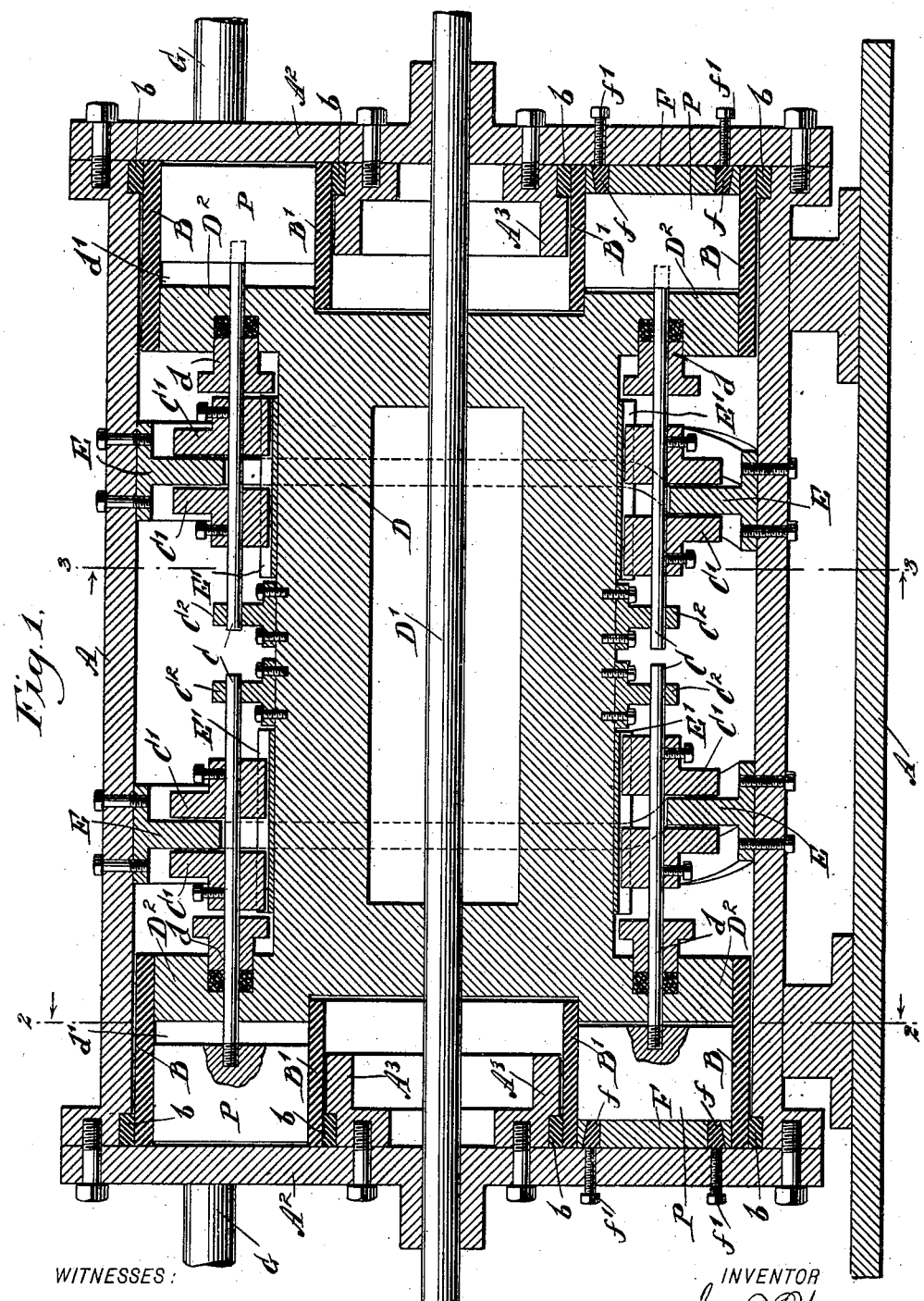
WITNESSES:
Edward Thorpe
H. L. Reynolds.
INVENTOR
S. T. Wilson
BY
ATTORNEYS.

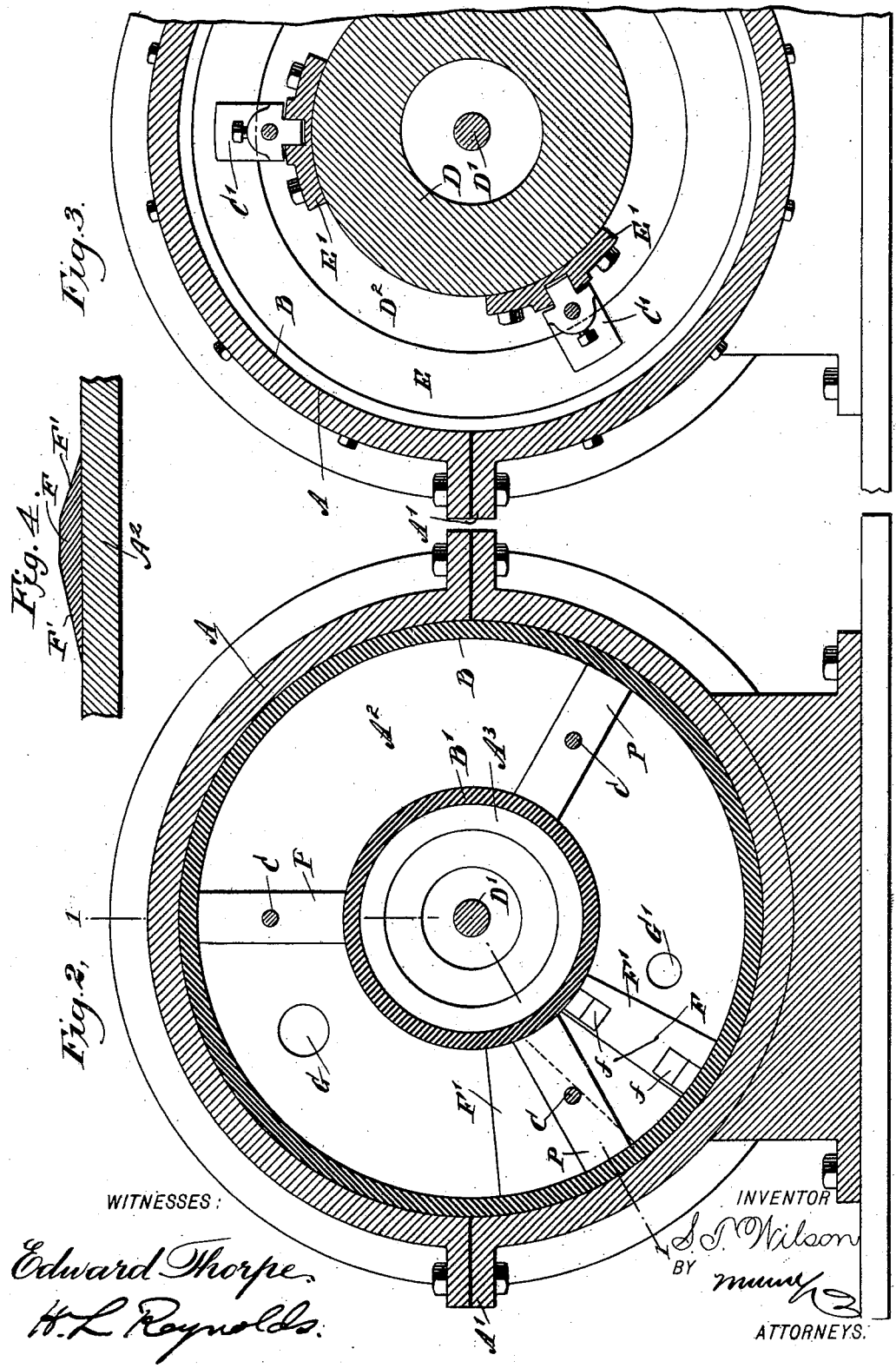

UNITED STATES PATENT OFFICE.

SAMUEL T. WILSON, OF CHARLESTON, WEST VIRGINIA, ASSIGNOR TO HIMSELF AND W. W. BRANCH, OF SAME PLACE.

ROTARY ENGINE.

SPECIFICATION forming part of Letters Patent No. 607,205, dated July 12, 1898.

Application filed August 21, 1897. Serial No. 649,024. (No model.)

*To all whom it may concern:*

Be it known that I, SAMUEL T. WILSON, of Charleston, in the county of Kanawha and State of West Virginia, have invented a new and Improved Rotary Engine, of which the following is a full, clear, and exact description.

My invention relates to an improvement in rotary engines of that class in which an annular cylinder is used and an abutment is placed therein having sloping approaches and a revolving piston-head fitting said cylinder and moved away from the face thereof when passing the abutment.

The invention consists of certain features of construction which will be hereinafter described, and pointed out in the appended claims.

Reference is to be had to the accompanying drawings, forming a part of this specification, in which similar characters of reference indicate corresponding parts in all the views.

Figure 1 is a longitudinal sectional view taken upon the line 1 1 of Fig. 2. Fig. 2 is a cross-sectional elevation taken upon the line 2 2 of Fig. 1, and Fig. 3 is a partial cross-sectional elevation taken upon the line 3 3 of Fig. 1. Fig. 4 is a section taken across the abutment F.

The engine is inclosed within a cylindrical casing A, which for purposes of manufacture and simplicity is preferably made in two parts bolted together by longitudinal flanges at A' or upon the middle line of the casing. The casing is closed at its ends by the heads $A^2$, which at their center are provided with bearings which receive the shaft D' of the rotating piston. The piston D consists of a cylinder which at its ends has flanges $D^2$ projecting radially therefrom and also longitudinally and fitting within the casing A. The annular cylinder is formed by the two rings B and B', which are attached to the heads $A^2$ and embrace the flanges $D^2$ upon the ends of the piston D, upon the outer and inner surfaces, respectively, of said flanges. The connection of the rings B B' to the heads $A^2$ is made tight by the use of packing-rings $b$.

The flanges $D^2$ are provided with a series of grooves $d'$, adapted to receive the piston-heads P. The grooves $d'$ extend across the end faces of the flanges and in a longitudinal direction into the same. In the drawings the engine is shown as provided with three of these grooves, and consequently with three piston-heads. The piston-heads consist of blocks P, which accurately fit the grooves $d'$, and to the blocks P are attached stems C, which extend in a longitudinal direction through holes in the flanges $D^2$. At the point where they pass through the flanges they are provided with ordinary packing boxes or glands $d$ to prevent steam escaping therethrough.

Back of the flanges $D^2$ there is a considerable space between the cylinder D, forming the piston, and the outside casing A. The stems C extend to nearly the center of this space and at the inner ends are supported in guides $C^2$, fixed to the outer surface of the cylinder D. Between each guide $C^2$ and the flange $D^2$ the stem C, supported therein, is provided with lugs C', which act as slides and by which the stem and the piston-head connected thereto are reciprocated. These lugs or slides C' are slightly separated and embrace cam ribs or flanges E, which are attached to the inner surface of the outer casing A and extend entirely around the same.

At one point in the circumference of the annular cylinder is provided an abutment F. The central portion of this abutment is level, and upon each side it is provided with inclines F'. When the piston-head reaches the incline, the lugs or slides C' engage a cam portion of the rib or flange E, which is deflected to one side in conformity with the shape of the abutment. The longitudinal reciprocation of the piston-head is therefore caused partly by direct contact of the piston-head with the surface of the abutment and partly by contact of the lugs or slides C' with the cam ribs or flanges E. The motion may, if desired, be caused entirely by the contact of the lugs or slides C' with the ribs or flanges E.

To prevent rotative action of the lugs C' upon the stem C, the outer surface of the cylinder D is provided with guides E', each consisting of a block having a slot therein which receives the inner end of the lugs C'. The abutment F is provided with packing-strips $f$, adapted to be adjusted by set-screws $f'$, so as to be maintained in a steam-tight condition. The inner rings B', forming the inner wall of the annular steam-cylinder, are supported by rings $A^3$, which are secured to the cylinder-heads $A^2$. Steam is admitted to the cylinder through the pipe G' and the exhaust escapes through the pipe G. The sides of the slot containing the piston-heads P or the sides of the pistons themselves may be grooved, so that steam may enter behind the piston-head to balance the pressure on the face thereof, or the piston-heads may be made to fit loosely within the groove, so as to accomplish the same purpose.

Having thus described my invention, I claim as new and desire to secure by Letters Patent—

1. A rotary engine, comprising a cylinder-casing, two separable rings attached to the heads thereof and forming therewith an annular cylinder open at one end, an abutment projecting from the casing-head, a cylindrical piston rotating concentric with the cylinder and having a flange at its end of greater diameter than the body thereof and projecting longitudinally into the annular cylinder, said flange having a slot extending across its face, a piston-head fitting said slot and cylinder, a stem attached to the said head, and extending longitudinally the piston and through the flange, a cam-ring surrounding the piston and lugs attached to the stem engaging the cam-ring to reciprocate the piston-head when it passes the abutment, substantially as described.

2. A rotary engine, comprising a cylinder-casing, two separable rings attached to the heads thereof and forming therewith an annular cylinder open at one end, an abutment projecting from the casing-head, a cylindrical piston rotating concentric with the cylinder and having a flange at its end, of greater diameter than the piston-body and projecting longitudinally beyond the end thereof into the annular cylinder, said flange having a slot extending across its face, a piston-head fitting said slot and cylinder, a stem attached to said head and extending longitudinally through the flange, a cam-ring surrounding the piston-lugs adjustably secured to the stem and engaging the cam-ring to reciprocate the stem-head when it passes the abutment, and guideways attached to the rotating piston and engaging the sides of said lugs, substantially as described.

SAMUEL T. WILSON.

Witnesses:
GEORGE MINSKER,
VAL FRUTH.